(12) United States Patent
Toborg et al.

(10) Patent No.: US 6,464,453 B2
(45) Date of Patent: Oct. 15, 2002

(54) TURBINE INTERSTAGE SEALING RING

(75) Inventors: Steven Milo Toborg, Lynn, MA (US);
Dennis Eugene Moore, Connersville, IN (US); Richard William Albrecht, Jr., Fairfield, OH (US)

(73) Assignee: General Electric Company, Schenectady, NY (US)

( * ) Notice: Subject to any disclaimer, the term of this patent is extended or adjusted under 35 U.S.C. 154(b) by 116 days.

(21) Appl. No.: 09/729,370

(22) Filed: Dec. 4, 2000

(65) Prior Publication Data

US 2002/0067987 A1 Jun. 6, 2002

(51) Int. Cl.[7] .............................. F01D 5/18; F01D 11/00
(52) U.S. Cl. ................ 415/115; 415/173.4; 415/173.7; 415/174.4
(58) Field of Search ..................... 415/115–116, 173.7, 415/174.4, 174.5, 173.4, 173.5; 416/95, 96 R, 97 R, 220 R

(56) References Cited

U.S. PATENT DOCUMENTS

| | | | |
|---|---|---|---|
| 2,863,634 A | * 12/1958 | Chamberlin et al. | 415/220 |
| 3,842,595 A | * 10/1974 | Smith et al. | 415/173.7 |
| 4,088,422 A | 5/1978 | Martin | 416/198 A |
| 4,309,147 A | * 1/1982 | Koster et al. | 416/95 |
| 4,820,116 A | 4/1989 | Hovan et al. | 415/115 |
| 4,882,902 A | 11/1989 | Reigel et al. | 60/39.75 |
| 4,884,950 A | 12/1989 | Brodell et al. | 416/174 |
| 5,288,210 A | 2/1994 | Albrecht et al. | 416/198 A |
| 5,318,405 A | 6/1994 | Meade et al. | 416/220 R |
| 5,338,154 A | 8/1994 | Meade et al. | 415/173.7 |
| 5,555,721 A | 9/1996 | Bourneuf et al. | 60/39.75 |
| 5,630,703 A | 5/1997 | Hendley et al. | 416/95 |
| 5,749,701 A | 5/1998 | Clarke et al. | 415/115 |
| 5,816,776 A | * 10/1998 | Chambon et al. | 415/174.5 |

* cited by examiner

*Primary Examiner*—Edward K. Look
*Assistant Examiner*—Igor Kershteyn
(74) *Attorney, Agent, or Firm*—Nathan D. Herkamp

(57) ABSTRACT

A unitary interstage sealing ring for bridging and sealing the space between the blade shanks of adjacent turbine rotors in a multi-stage turbine. The sealing ring serves to confine relatively cool air conveyed to the turbine so the cooling air flows into the turbine blades for maintaining the blades at a desired temperature. The sealing ring includes a disk-shaped body member that includes a pair of axially-spaced, radially-extending arms that terminate in respective seal teeth for engagement with a stationary annular sealing member. Each of the radial arms includes an outwardly-extending axial arm that terminates in a disk engagement member for sealing engagement with the face of an adjacent turbine disk to confine cooling air within the space between the adjacent turbine disks. Additionally, one of the disk engagement members includes at least one, projection that contacts a respective turbine rotor to limit relative rotation between the sealing ring and the turbine.

19 Claims, 6 Drawing Sheets

TURBINE INTERSTAGE SEALING RING

BACKGROUND OF THE INVENTION

The present invention relates to gas turbine engines having a multi-stage turbine. More particularly, the present invention relates to an interstage sealing and torque ring for disposition between adjacent stages in a gas turbine engine having a multi-stage turbine.

Gas turbine engines having multiple turbine stages include sealing arrangements between adjacent stages for improved operating efficiency. The sealing arrangements are directed to confining the flow of hot combustion gases to flow in an annular path around and between the stationary turbine stator blades, or nozzles, and also around and between the adjacent rotor blades. In addition to serving to confine the hot combustion gases to flow in a predetermined annular path, such sealing arrangements also serve to confine and to direct cooling air that is provided to cool the turbine disks, the turbine blade roots, and also the interior of the rotor blades themselves. In that regard, providing rotor blade cooling passages allows higher turbine inlet temperatures, which results in higher thermal efficiency of the engine and higher power or thrust output. However, the air for cooling the turbine rotor blades must be suitably confined and directed so that it is not dissipated by passing into the hot gas stream, but, instead, passes over and through the surfaces and structures intended to be cooled, and so that it also passes into the rotor blade internal passageways to provide the desired rotor blade cooling effect.

In the past, various turbine interstage seal configurations have been proposed. Some of the previous arrangements incorporated rotating disks that define sealing rings that include a peripheral labyrinth seal for engagement with a stationary, annular sealing ring carried on an interior surface of the stationary turbine nozzle. Some arrangements included forwardly and rearwardly-extending arms for engagement with rotor blade retaining rings carried by the adjacent turbine rotor stages. Other previous arrangements included integrally-formed rotor blade retainers to prevent axial movement of the rotor blades relative to the rotor disks, and inner hubs that connected with one or more of the adjacent rotor disks for causing the seals to rotate with the turbine rotor. However, multiple element seal and blade retainer arrangements involve additional parts and additional assembly operations, and they can also involve problems of maintaining proper orientation of the several parts to provide the desired sealing effect.

In addition to the logistical and assembly problems that inhere in such multiple-element arrangements, it is also necessary that the sealing arrangement be capable of accommodating axial and radial movements of the turbine stage elements during engine operation. The several elements are subjected to a range of different loadings and different rates of expansion based upon local part temperatures and also based upon engine and aircraft operating conditions.

Accordingly, it is desirable to provide a turbine interstage sealing member that can provide an effective seal to confine combustion gases to flow in a desired annular channel, to separate combustion gases from cooling air flows, and to do so with a unitary structural arrangement that facilitates assembly of a multi-stage turbine and that is also capable of responding to thermally- and mechanically-induced size and orientation changes of the turbine structural elements.

SUMMARY OF THE INVENTION

Briefly stated, in accordance with one aspect of the present invention, an interstage sealing ring is provided for sealing a space between adjacent turbine rotors of a multi-stage turbine. The sealing ring includes a substantially disk-shaped body member having first and second axially-spaced, substantially radially-outwardly-extending arms. The first radial arm includes a forwardly-extending, substantially axial first arm that terminates in an engagement surface for engagement with the surface of a first turbine rotor. The second radial arm. includes a rearwardly-extending, substantially axial second arm that terminates in an engagement surface for engagement with a second turbine rotor that is spaced axially from the first turbine rotor. The sealing ring defines a bridging member between adjacent turbine rotors to confine cooling air that is provided in the space between the adjacent turbine rotors so the cooling air flows into cooling air passageways within the turbine rotor blades.

In accordance with another aspect of the present invention, a turbine cooling system is provided for a multi-stage turbine that includes a pair of axially-spaced turbine rotors. The cooling system includes an interstage cooling chamber defined by a space between a pair of axially-adjacent turbine rotors, and an annular rotor-disk-connecting ring positioned adjacent a hub of each turbine rotor and interconnecting the adjacent rotor disks for co-rotation. An interstage sealing member is positioned radially outwardly of the disk connecting ring. A plurality of cooling air passageways are provided in an upstream turbine disk for conveying cooling air through the disk and into the interstage cooling chamber. The interstage sealing member includes a substantially disk-shaped body member having a pair of axially-spaced, substantially radially-outwardly extending arms. A forwardly-extending, substantially axial first arm terminates in an engagement surface for engagement with a first turbine rotor, and a rearwardly extending, substantially axial second arm terminates in a engagement surface for engagement with a second turbine rotor that is spaced axially from the first turbine rotor.

BRIEF DESCRIPTION OF THE DRAWINGS

The structure, operation, and advantages of the present invention will become further apparent upon consideration of the following description, taken in conjunction with the accompanying drawings, in which.

DETAILED DESCRIPTION OF THE INVENTION

Figure 1:
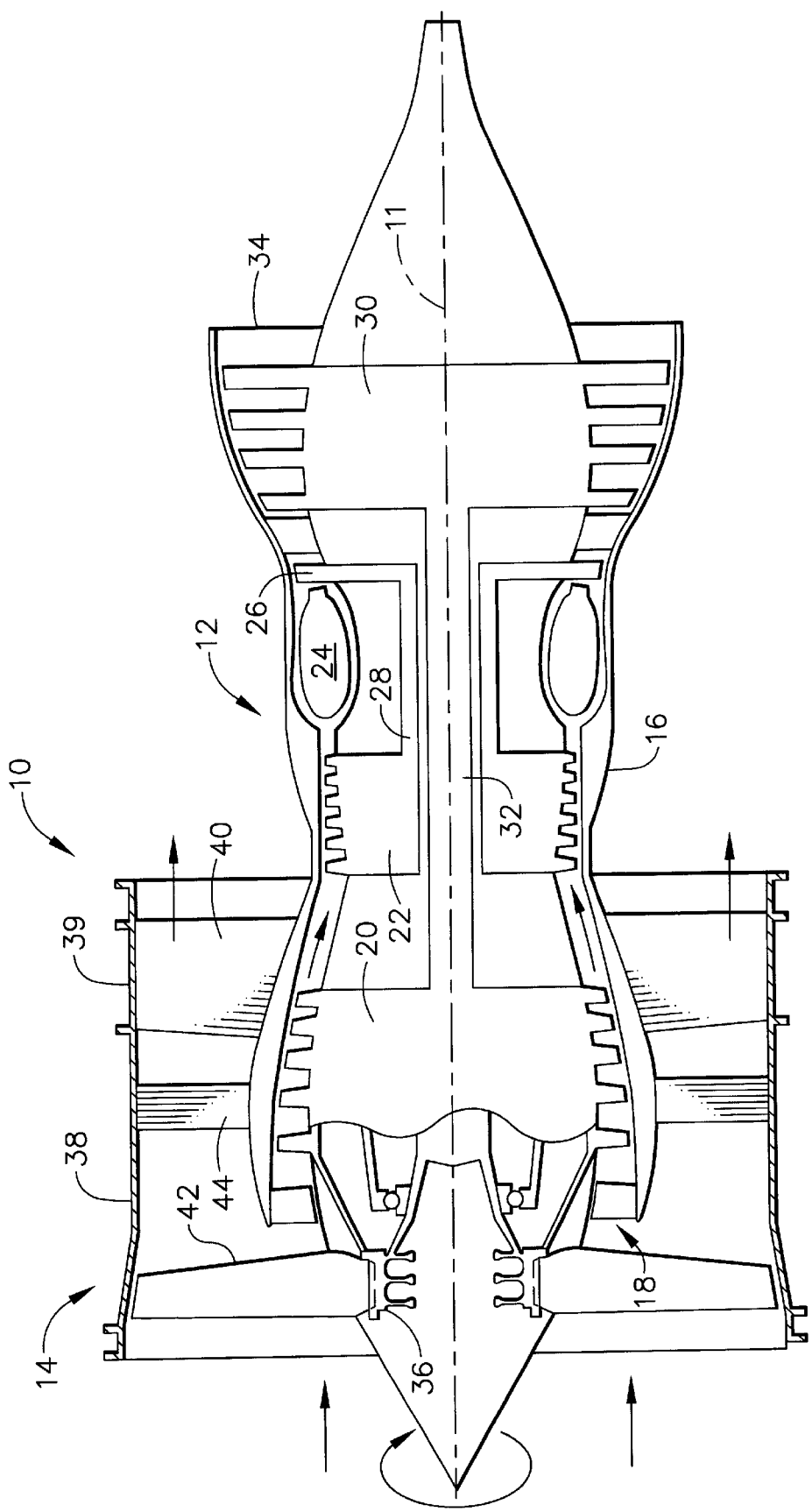
FIG. 1 is a longitudinal, cross-sectional view of an aircraft gas turbine engine having a multi-stage turbine.

Referring now to the drawings, and particularly to FIG. 1 thereof, there is shown in diagrammatic form an aircraft turbofan engine 10 having a longitudinal axis 11, and including a core gas turbine engine 12 and a fan section 14 positioned upstream of the core engine. Core engine 12 includes a generally tubular outer casing 16 that defines an annular core engine inlet 18 and that encloses and supports a low pressure booster 20 for raising the pressure of the air that enters core engine 12 to a first pressure level. A high pressure, multi-stage, axial-flow compressor 22 receives pressurized air from booster 20 and further increases the pressure of the air. The pressurized air flows to a combustor 24 in which fuel is injected into the pressurized air stream, and the fuel-air mixture is ignited to raise the temperature and energy level of the pressurized air. The high energy combustion products flow to a first turbine 26 for driving compressor 22 through a first drive shaft 28, and then to a second turbine 30 for driving booster 20 through a second drive shaft 32 that is coaxial with first drive shaft 28. After driving each of turbines 26 and 30, the combustion products leave core engine 12 through an exhaust nozzle 34. to provide propulsive jet thrust.

Fan section 14 includes a rotatable, axial-flow fan rotor 36. An annular fan casing 38 surrounds fan rotor 36 and is supported from core engine 12 by a plurality of substantially radially-extending, circumferentially-spaced support struts 44. Fan rotor 36 carries a plurality of radially-extending, circumferentially spaced fan blades 42. Fan casing 38 extends rearwardly from fan rotor 36 over an outer portion of core engine 12 to define a secondary, or bypass airflow conduit. A casing element 39 that is downstream of and connected with fan casing 38 supports a plurality of fan stream outlet guide vanes 40. The air that passes through fan section 14 is propelled in a downstream direction by fan blades 42 to provide additional propulsive thrust to supplement the thrust provided by core engine 12.

Figure 2:
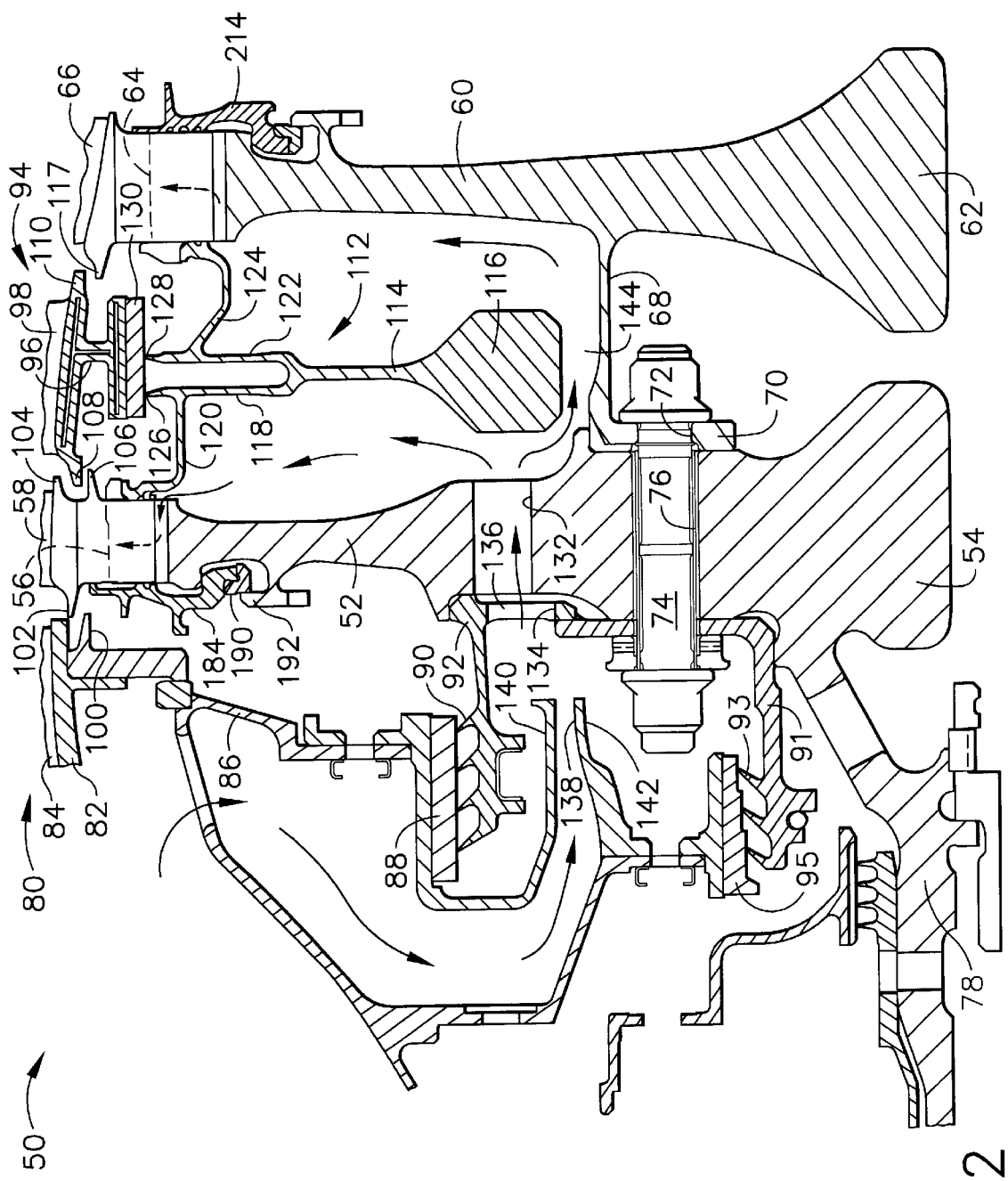
FIG. 2 is an enlarged, fragmentary, cross-sectional view of a two-stage turbine that includes an embodiment of an interstage torque and sealing ring.

The turbine section of engine 10 is shown in enlarged, fragmentary form and in cross section in FIG. 2. Turbine 50 includes a first stage turbine rotor that is defined by a rotor disk 52 that has an enlarged hub 54, and an outer periphery 56 that carries a plurality of circumferentially-spaced first stage rotor blades 58. Spaced axially downstream from and adjacent to first stage turbine disk 52 is a second stage turbine rotor that is defined by a rotor disk 60 that also includes an enlarged hub 62, and that has an outer periphery 64 on which are carried a plurality of circumferentially-spaced, second stage rotor blades 66. Second stage disk 60 includes an axially-forwardly-extending annular drive ring 68 that carries a radially-inwardly-directed flange 70 that includes a plurality of circularly-distributed bolt holes 72. Connecting bolts 74 extend through bolt holes 72 and through corresponding bolt holes 76 provided in first stage disk 52 for interconnecting first and second stage turbine disks 52, 60 so that they rotate together. Additionally, first stage disk 52 includes an integral, forwardly-extending, annular drive shaft 78 that is drivingly connected with the core engine compressor.

Positioned upstream of first stage turbine disk 52 and radially adjacent first stage rotor blades 58 is a first stage turbine nozzle 80. Nozzle 80 includes an annular inner ring 82 and an annular outer ring (not shown) between which are positioned a plurality of radially-extending, circumferentially-spaced, stationary first stage nozzle vanes 84. First stage nozzle inner ring 82 is suitably connected with a generally radially-inwardly-extending ring 86 that carries an annular abradable seal 88 on its inner periphery for sealing engagement with a labyrinth seal 90 forming part of an axially-extending, outer sealing ring 92. An inner sealing ring 91 that is radially-inwardly spaced from outer sealing ring 92 includes a labyrinth seal 93 that is in sealing engagement with an annular abradable seal 95. Sealing rings 91 and 92 are each connected with and rotate with first stage turbine disk 52.

Between first and second stage rotor disks 52, 60 is positioned a second stage turbine nozzle 94. Nozzle 94 includes an inner annular ring 96 and an outer annular ring (not shown) between which are carried a plurality of radially-extending, circumferentially-spaced, stationary second stage nozzle vanes 98. During operation of the engine hot combustion gases pass from the combustor (see FIG. 1) into first stage turbine nozzle 80 which directs the gases against first stage turbine blades 58 to rotate first stage turbine disk 52. The gases that exit from first stage turbine blades 58 enter second stage turbine nozzle 94, which directs the gasses against second stage turbine blades 66 to rotate second stage turbine disk 60.

To confine the flow of the hot combustion gases in the intended flow channel, first stage nozzle 80 includes an axially-rearwardly-extending sealing lip 100. Lip 100 is positioned adjacent to and forward of a cooperating, forwardly-extending sealing lip 102 carried by first stage disk 52. Sealing lip 102 is defined by forward extensions of the blade platforms of each of first stage turbine rotor blades 58, and also by forwardly-extending elements of damper seals (not shown) carried by first stage disk 52 in the spaces between adjacent blades and the disk outer periphery. Each of nozzle sealing lip 100 and rotor forward sealing lip 102 define annular sealing rings that overlap each other in a radial direction so that combustion gases pass through the flow channel defined between the overlapped sealing lips and the turbine outer casing.

Similar annular sealing rings are provided between first stage turbine rotor blades 58 and second stage nozzle 94. A pair of sealing rings are defined by a plurality of radially-spaced, rearwardly-extending sealing lips 104, 106 on first stage rotor blades 58. Sealing lips 104, 106 cooperate with an annular second stage nozzle forward sealing lip 108 that extends into the space between sealing lips 104, 106 to block the inward flow of combustion gases. Between second stage nozzle 94 and second stage turbine blades 66 a similar sealing arrangement is provided by second stage nozzle aft sealing lip 110 and second stage turbine blade forward sealing lip 117, which are also in overlapped relationship in a radial direction.

Positioned between first stage turbine disk 52 and second stage turbine disk 60 is an interstage sealing ring 112. Ring 112 extends between and is in contact with the aft face of first stage turbine disk 52 and with the forward face of second stage turbine disk 60. Sealing ring 112 is a substantially "T"-shaped member in cross section and includes a disk-shaped, radially-extending body member 114 that is positioned between an enlarged hub 116 and an outer section that is defined by a forward radial arm 118, from which a forward axial arm 120 extends is an upstream direction, and an aft radial arm 122, from which an aft, generally axial arm 124 extends in a downstream direction. Forward radial arm 118 and aft radial arm 122 are spaced from each other in an axial direction, relative to the engine longitudinal axis, and they can be parallel to each other as shown and have a relatively thin cross section. Forward and aft radial arms 118, 122 can independently deflect, relative to body 114, in a fore and aft direction of the turbine, in the manner of cantilever beams supported by body 114, to respond movement of the turbine parts relative to each other resulting from thermal and mechanical loads imposed upon the respective turbine stages during engine operation. The outer periphery of forward radial arm 118 includes a circumferentially-extending seal tooth 126 and the outer periphery of aft radial arm 122 includes a similar circumferentially-extending seal tooth 128. Each of seal teeth 126, 128 is adapted to engage with an annular abradable seal member 130 carried on inner nozzle ring 96 of second stage turbine nozzle 94 to provide an outer interstage seal.

First stage turbine disk 52 includes a plurality of circularly-disposed, axially-extending cooling air passageways 132 that pass completely through disk 52. Passageways 132 are positioned radially outwardly of connecting bolt holes 76 and between sealing rings 91 and 92. A plurality of openings 134 are provided in and extend through radial connecting leg 136 of sealing ring 92, which is clamped against the forward face of first stage turbine disk 52 by a radially-extending leg of inner sealing ring 91. Positioned immediately upstream of openings 134 is an annular cooling air duct 138 defined by an outer annular ring 140 and radially-inwardly-spaced inner annular ring 142, and to which bleed air from the compressor (see FIG. 1) is conveyed. The relatively cool bleed air passes through openings 134 in sealing ring 92 and through cooling air passageways 132 in first stage disk 52, into cooling air chamber 144 that is defined by the volume between first and second stage turbine disks 52, 60 and arms 120, 124 of interstage sealing ring 112. Thus, cooler compressor bleed air enters cooling air chamber 144 and can be utilized for cooling turbine rotor disks 52, 60, as well as turbine rotor blades 58, 66, as will be explained hereinafter.

Figure 3:
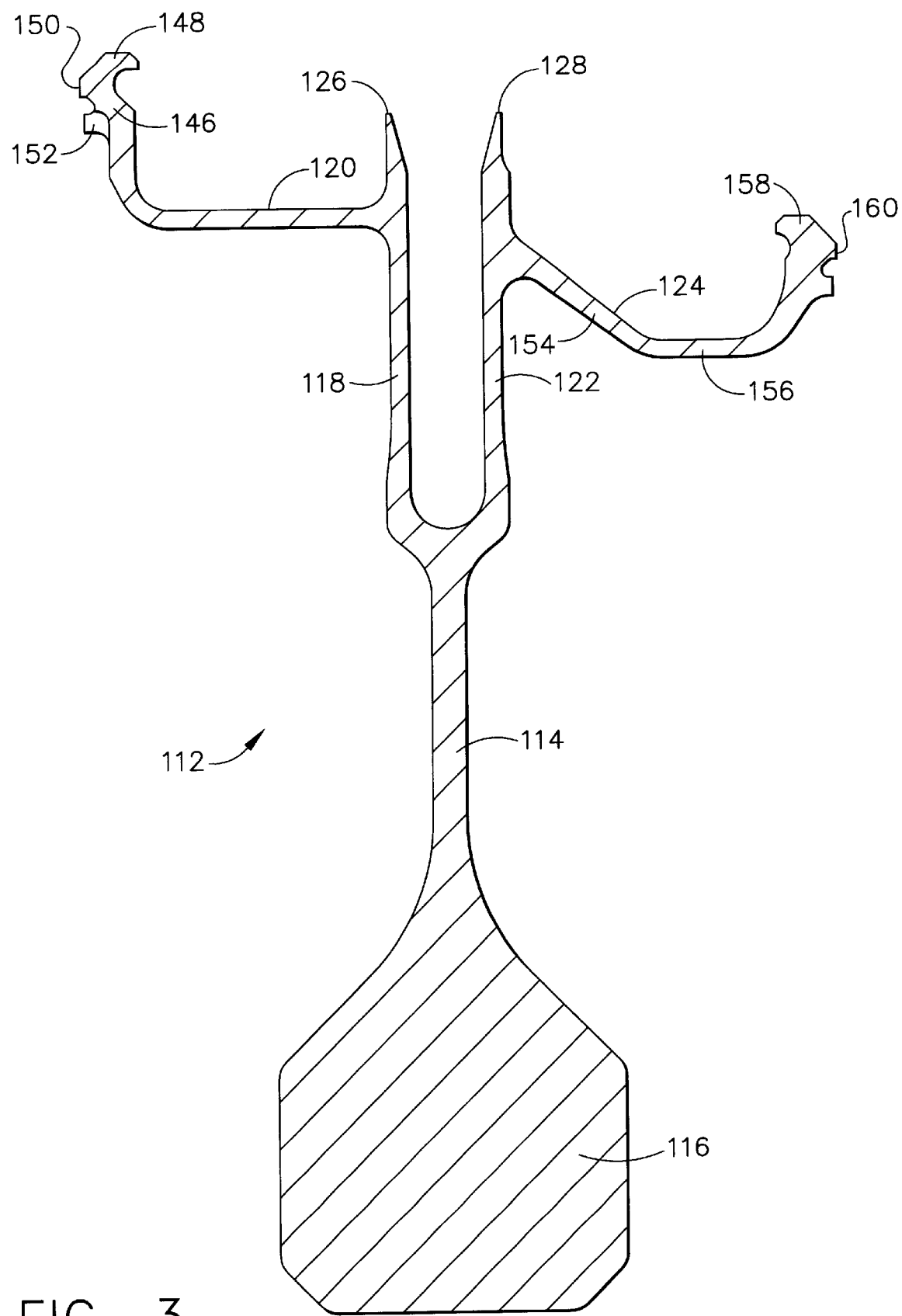
FIG. 3 is an enlarged, cross-sectional view of the interstage torque and sealing ring shown in FIG. 1.

As shown in enlarged detail in FIG. 3, forward axial arm 120 of interstage sealing ring 112 is substantially perpendicular to forward radial arm 118. However, if desired, axial arm 120 can be oriented at an acute angle that is defined by the included angle between axial arm 120 and radial arm 118. Additionally, although shown in FIGS. 2 and 3 as of rectilinear form in cross section, axial arm 120 can be curved, if desired. In that regard, the configuration of axial arm 120 is preferably such that its outer end can deflect radially and axially, relative to the turbine longitudinal axis, in response to thermal and mechanical loads imposed on sealing ring 112 and on turbine disk 52, so that the outer end of arm 120 is maintained in contact with the downstream surface of turbine disk 52.

At its outermost end forward axial arm 120 includes a substantially radially-extending flange 146 that carries a forward disk engagement member 148. Engagement member 148 includes an annular, substantially radially-extending disk engagement surface 150, and a plurality of axially-forwardly-extending and circularly-disposed projections 152 with intervening slots. The projections on engagement member 148 contact axial projections (not shown) carried by rotor blades 58 to limit relative rotation between first stage disk 52 and interstage sealing ring 112.

Aft arm 124 extends outwardly from aft radial arm 122 at a radial position that is spaced inwardly, relative to hub 116, as compared with the radial position at which forward axial arm 120 extends from forward radial arm 118. Aft arm 124 includes an inclined section 154 and a generally-axially-extending section 156. Inclined section 154 can be disposed relative to radial, arm 122 at an included acute angle of about 450, although the precise angle of inclination can be varied, if desired. The relative lengths of inclined section 154 and of generally-axially-extending section 156 are selected so that an aft disk engagement member 158 carried at the outermost end of aft, arm 124 is positioned opposite and in contact with the second stage disk and the shank areas of the second stage rotor blades. Aft disk engagement member 158 includes an annular, substantially radially-extending disk engagement surface 160 for engagement with the forward face of second stage turbine disk 60 and the second stage rotor blade shanks.

The included obtuse angle between inclined section 154 and generally-axially-extending section 156 can be of the order of about 140°. Again, however, the precise angle of inclination can be varied, if desired, and is generally based upon the radial point of contact of aft farm 124 with turbine disk 60. In that regard, the point of connection between inclined section 154 and radial arm 122, the angle of inclination of inclined section 154 relative to radial arm 122, and the relative lengths and thicknesses of arm sections 154 and 156 are selected to allow aft arm 124 to deflect radially and axially, relative to the turbine longitudinal axis. Consequently, aft disk engagement member 158 remains in contact with the forward surface of disk 60, and also with the shanks of the rotor blades carried thereby, in response to relative movement of the turbine parts that occurs as a result of changes in thermal and mechanical loads imposed on the turbine during engine operation.

The configuration of interstage sealing ring 112 is such as to provide tight engagement of the respective disk engagement surfaces 150, 160 with the first and second turbine disks and blades, to substantially seal cooling air chamber 144 between turbine disks 52 and 60. Forward radial arm 118 and aft radial arm 122 are each thinner in an axial direction than is body member 114, to allow deflection of the outer portions of radial arms 118, 122 in an axial direction of the turbine, to respond to dimensional changes between first and second stage turbine disks 52, 60 as a result of expansion and contraction of the turbine parts resulting from changing thermal and mechanical loading conditions on the turbine over the operating range of the engine. In that regard, sufficient preload is preferably provided between annular engagement surfaces 150, 160 and the respective turbine disks so that contact therebetween is maintained even if the axial spacing between the opposed surfaces of the turbine disks increases during engine operation. Similarly, when the spacing between the opposed surfaces of the turbine disks decreases, the flexural characteristics of forward and aft radial arms 118, 122, respectively, allow deflection of those arms to occur to accommodate such spacing decreases. In that regard, radial arms 118, 122 act as cantilever beams that are subjected to a concentrated load. Further, each of forward disk engagement member 148 and aft disk engagement member 158 is capable of radial movement, relative to the turbine longitudinal axis, as a result of deflection of arms 120 and 124, again, to respond to expansion or contraction of the turbine parts in a radial direction caused by thermal and mechanical loading effects. Thus, forward axial arm 120 and forward radial arm 118 can deflect under load to allow combined radial and axial movement of forward disk engagement member 148, and aft arm 124 and aft radial arm 122 can deflect under load to allow both radial and axial movement of aft disk engagement member 158.

Figure 4:
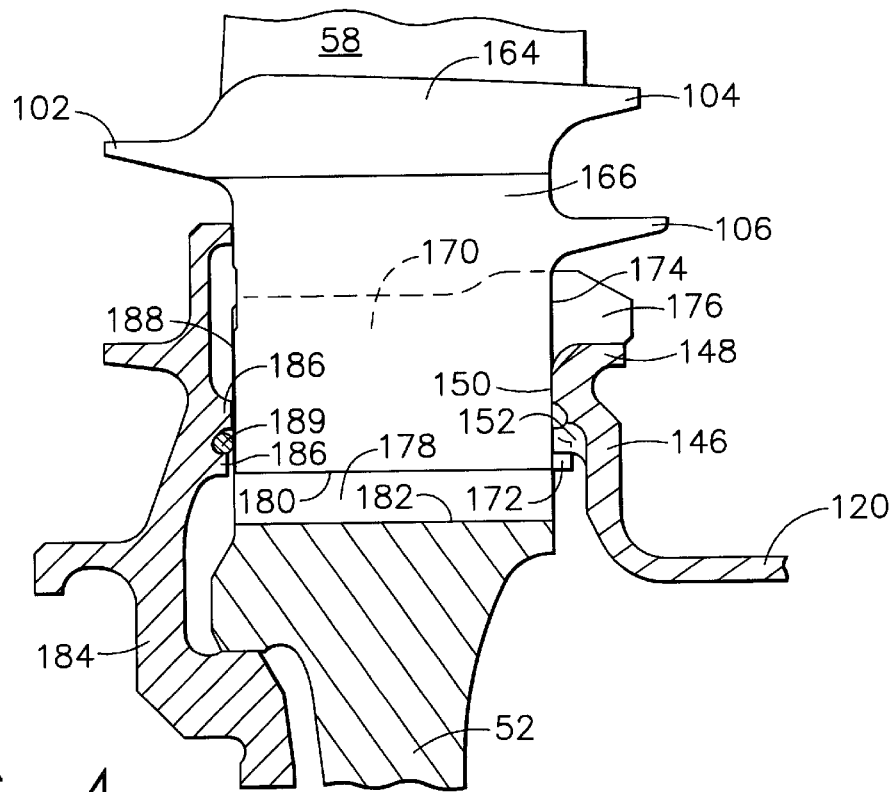
FIG. 4 is an enlarged, fragmentary, cross-sectional view of the first stage turbine disk and rotor blade connection arrangement shown in FIG. 2.
Figure 5:
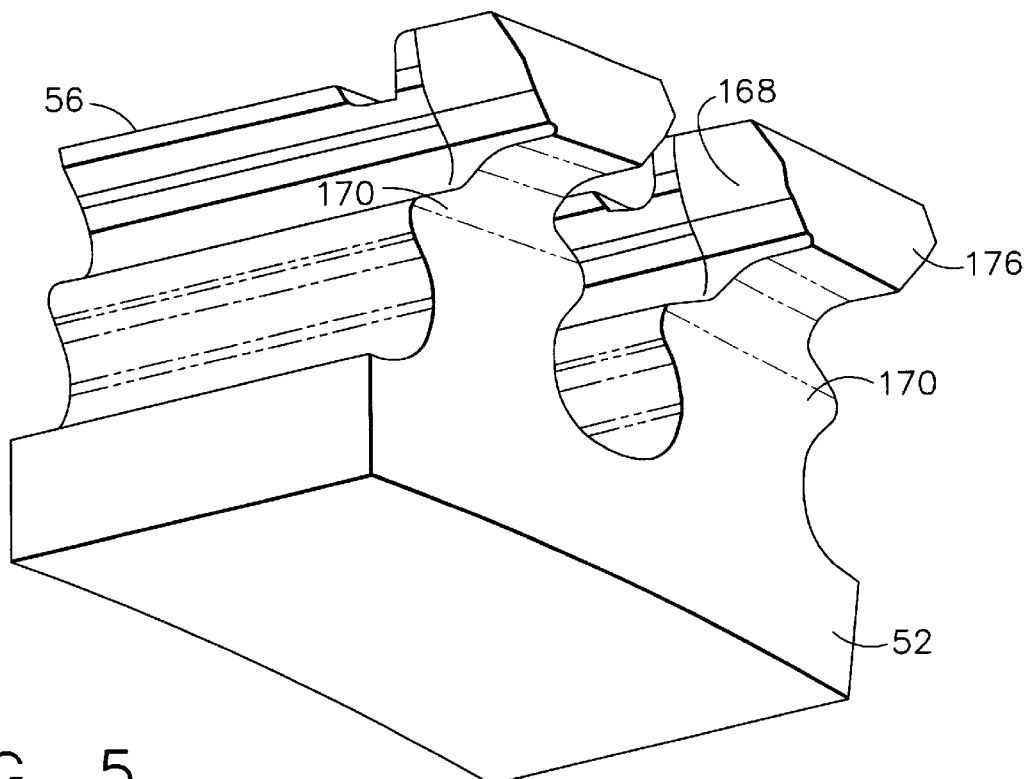
FIG. 5 is a fragmentary perspective view of the outer periphery of the first stage turbine disk at the downstream face of the disk, showing the rotor-blade-receiving slots and intervening disk posts.

Referring now to FIG. 4, first stage rotor blades 58 are positioned on a blade platform 164, the axially-extending outermost ends of which define forward sealing lip 102 and aft sealing lips 104, 106. Below blade platform 164 is a blade shank 166, which is of a generally dovetail-shaped configuration in axial cross section, to allow it to be axially slidably received within a correspondingly-shaped dovetail slot 168 provided in first stage first stage disk 52 (see FIG. 5). Dovetail slot 168 is defined by the peripheral spaces between adjacent, circumferentially-spaced disk posts 170. Blade shanks 166 each also include an axially-extending projection 172 that is carried on the aft face 174 of blade shank 166 and that is received in a respective gap between adjacent axial projections 152 carried on forward disk engagement member 148 of interstage ring 112. The contact between projections 172 carried by the blade shanks and projections 152 carried by interstage sealing ring 112 serve to limit relative rotation between the first stage rotor and sealing ring 112. Blade shanks 166 are held against movement in a peripheral direction relative to first stage disk 52 by respective adjacent disk posts 170, each of which includes an axially-rearwardly-extending post extension 176.

Blade shanks 166 have a depth in a radial direction, relative to first stage disk 52, that is less than the radial depth of dovetail slot 168, to provide an axially-extending cooling air passageway 178 therebetween. Cooling air passageway 178 extends between blade shank bottom face 180 and dovetail slot bottom wall 182 and receives cooling air that flows from cooling air chamber 144 (see FIG. 2). The cooling air can pass through radially-extending channels (not shown) provided in blade shank 166 and into the airfoil portion of first stage rotor blade 58 to provide cooling air to the first stage blades. As best seen in FIG. 4, annular engagement surface 150 of forward disk engagement member 148 of the interstage sealing ring bears against the aft faces 174 of blade shanks 166, and also against the aft faces of disk posts 170. Thus, disk engagement member 148 provides a blade retention function to block rearward movement blade shanks 166. Additionally, the uppermost annular surface of forward disk engagement member 148 bears against the lower annular face of post extension 176 to limit radial outward movement interstage sealing ring 112.

A forward blade retainer 184 is provided in the form of an annular disk that lies against the forward face of first stage disk 52. Forward blade retainer 184 includes a plurality of axially-extending, radially-spaced engaging ridges 186 that engage with the forward faces 188 of blade shanks 166 and the forward faces of adjacent disk posts 170. A seal wire 189 is carried in the annular space between engaging ridges 186 to maintain an air seal, to prevent cooling air from passing between blade retainer 184 and blade shanks 166. Thus, the cooling air flows in the directions shown by the several arrows in FIG. 2, from interstage cooling air chamber 144 into cooling air passageway 178, and then into cooling passageways (not shown) within the shanks and the airfoil portions of each of first stage blades 58. As best seen in FIG. 2, forward blade retainer 184 is held in position by a split ring 190 that is positioned between forward blade retainer 184 and a radial lip 192 carried by disk 52. Lip 192 is spaced axially forwardly of and extends radially relative to first stage turbine disk 52.

Figure 6:
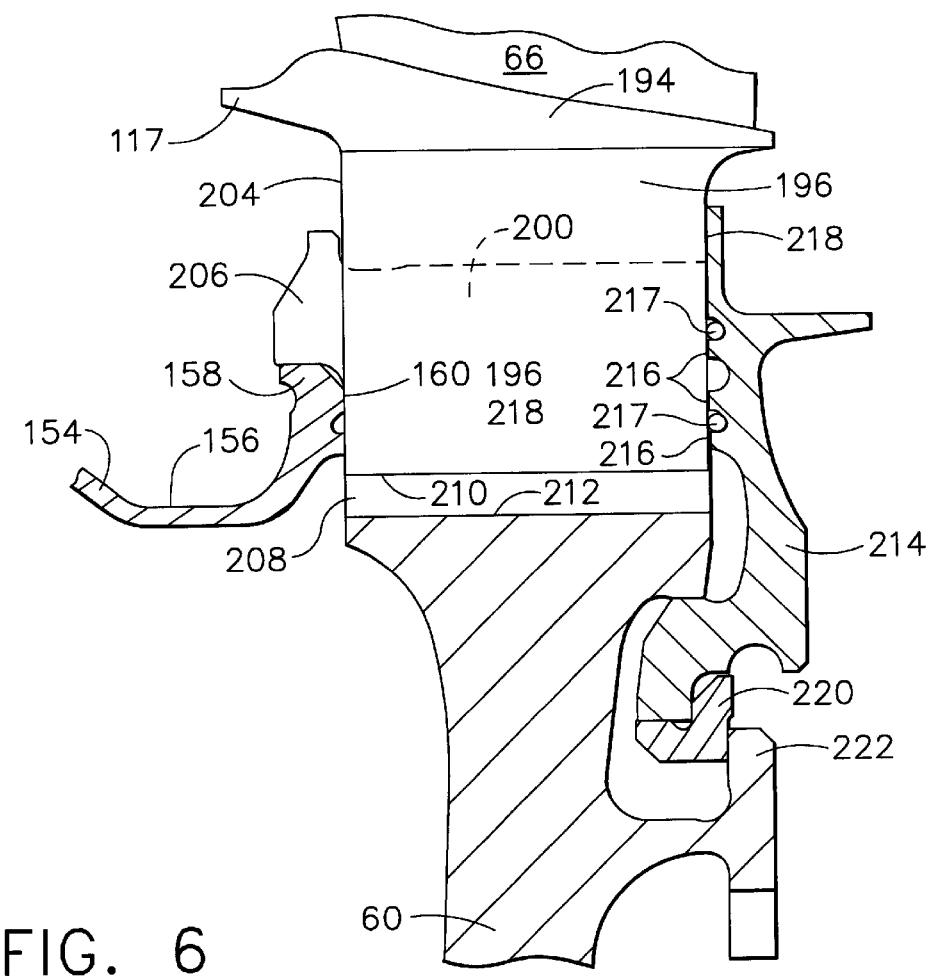
FIG. 6 is an enlarged, fragmentary, cross-sectional view of the second stage turbine disk and rotor blade connection arrangement shown in FIG. 2.

The interconnection of second stage rotor blades 66 with second stage rotor disk 60 is shown in FIG. 6 and is similar to that of the first stage blades and disk. Second stage rotor blades 66 are positioned on a blade platform 194, the axially-extending forward end of which defines forward sealing lip 117. Below blade platform 194 is a blade shank 196, which is of a generally dovetail-shaped configuration in axial cross section to allow it to be axially slidably received within a correspondingly-shaped dovetail slot 198 provided in second stage rotor disk 60 (see FIG. 7). Dovetail slot 198 is defined by the peripheral spaces between adjacent, circumferentially-spaced disk posts 200. Blade shanks 196 are held against movement in a peripheral direction relative to rotor disk 60 by respective adjacent disk posts 200, each of which includes an axially-forwardly-extending post extension 206.

Blade shanks 196 have a depth in a radial direction, relative to rotor disk 60, that is less than the radial depth of dovetail slot 198, to provide an axially-extending cooling air passageway 208 therebetween. Cooling air passageway 208 extends between blade shank bottom face 210 and dovetail slot bottom wall 212 and receives cooling air that flows from cooling air chamber 144 (see FIG. 2). The cooling air can pass through radially-extending passageways (not shown) provided in blade shanks 196 and into the airfoil portions of second stage rotor blade 66 to provide cooling air to the second stage blades.

As best seen in FIG. 6, annular engagement surface 160 of aft disk engagement member 158 of the interstage sealing ring bears against the forward faces 204 of blade shanks 196, and also against the forward faces of disk posts 200. Thus, disk engagement member 158 provides a blade retention function to block forward movement of blade shanks 196. Additionally, the uppermost annular surface of aft disk engagement member 158 bears against the lower annular face of post extension 206 to limit radial outward movement interstage sealing ring 112.

An aft blade retainer 214 is provided in the form of an annular disk that lies against the aft face of rotor disk 60. Aft blade retainer 214 includes a plurality of annular, axially-extending, radially-spaced engaging ridges 216 that engage with the aft faces 218 of blade shanks 196 and the forward faces of adjacent disk posts 200. A seal wire 217 is carried in the annular spaces between each of two pairs of adjacent engaging ridges 216, to maintain an air seal, to prevent cooling air from passing between blade retainer 214 and blade shanks 196. As shown by the flow arrows in FIG. 2, cooling air thus flows from interstage cooling air chamber 144, into cooling air passageway 208, and then into cooling passageways (not shown) within the shanks and the airfoil portions of each of second stage rotor blades 66. Aft blade retainer 214 is held in position against the downstream face of second stage disk 60 by a split ring 220 that is positioned between aft blade retainer 214 and a radial lip 222 carried by disk 60. Lip 222 is spaced axially rearwardly of and extends radially relative to second stage turbine disk 60.

It will therefore be apparent that interstage sealing ring 112 defines an annular outer wall to confine cooling air to cooling air chamber 144 between first and second stage rotor disks 52, 60, respectively, so that the cooling air enters the respective cooling channels below the rotor blades and flows into and through the rotor blades for cooling purposes. The provision of rotor blade cooling air allows higher turbine inlet temperatures, which results in higher engine thermal efficiency and higher thrust output.

Figure 7:
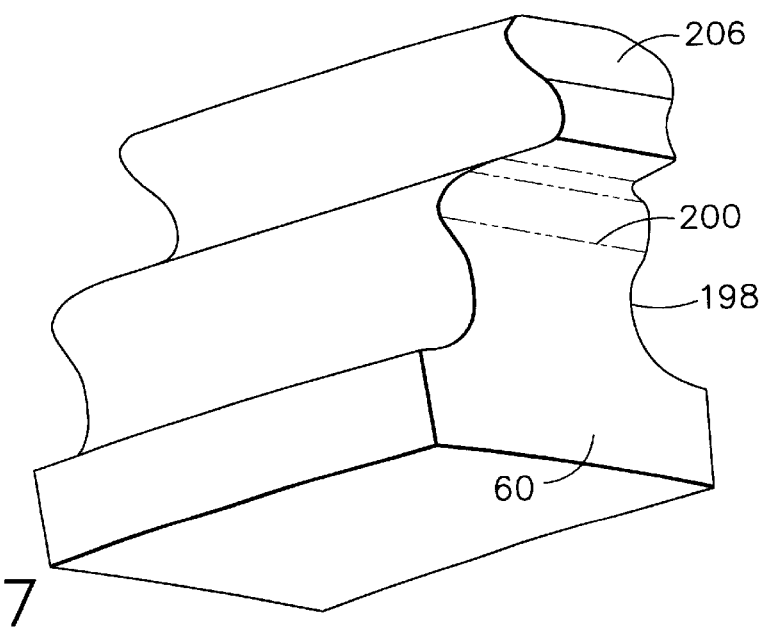
FIG. 7 is a fragmentary perspective view of the outer periphery of the second stage turbine disk at the upstream face of the disk, showing the rotor-blade-receiving slots and intervening disk posts.
Figure 8:
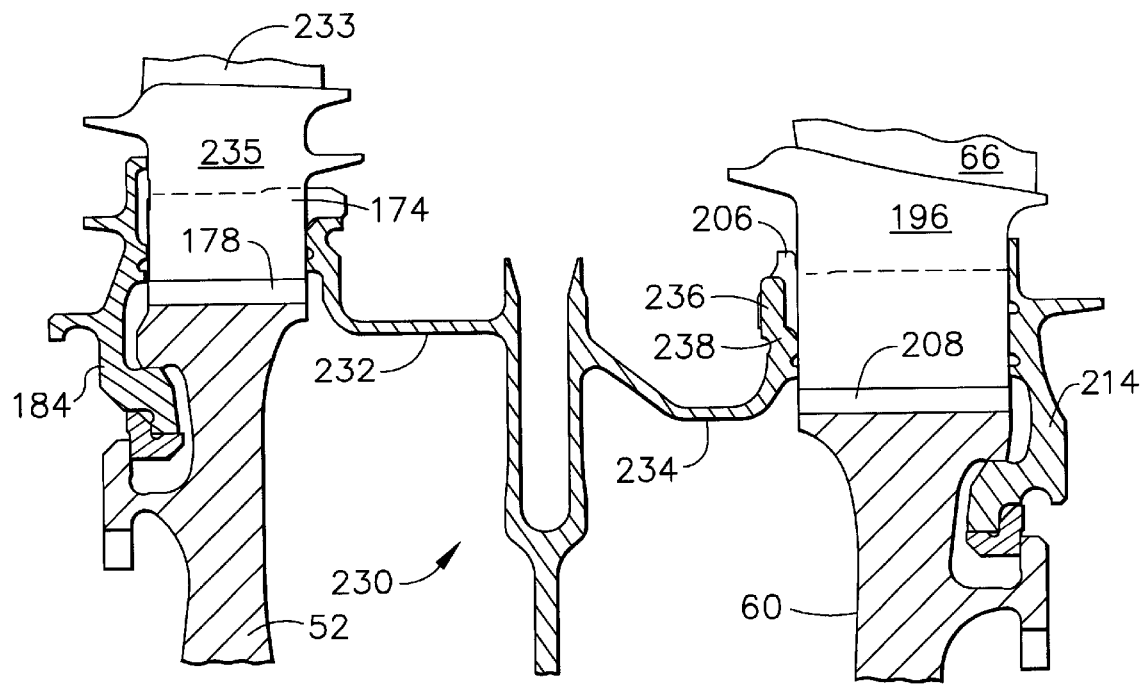
FIG. 8 is a fragmentary, cross-sectional view of another embodiment of an interstage torque and sealing ring.
Figure 9:
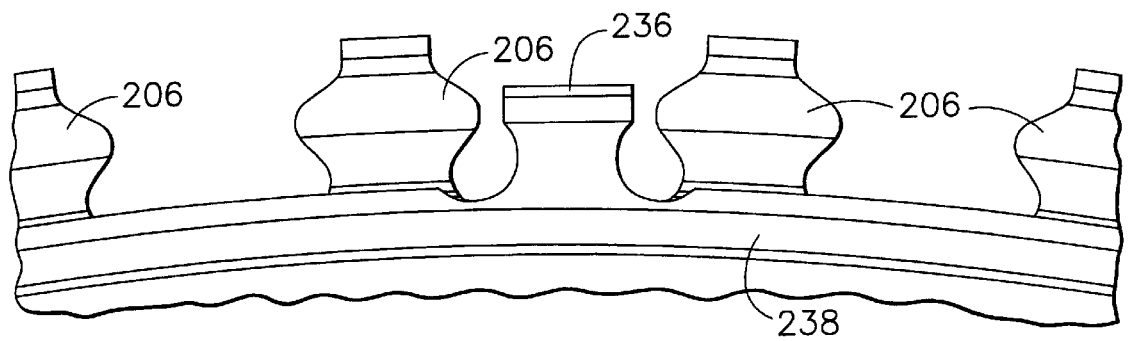
FIG. 9 is a fragmentary view of the periphery of the second stage turbine disk of FIG. 8 showing the positioning of an aft arm anti-rotation projection relative to the second stage disk posts.

FIGS. 7 and 8 show another embodiment of a turbine interstage sealing and torque ring. Ring 230 is generally similar in overall structure to ring 112, except that ring 230 does not include the teeth 152 that are provided on forward axial arm 120 of ring 112. Thus forward arm 232 is merely in surface-to-surface contact with the aft face 231 of the shank 235 of first stage blade 233 and with the aft face of first stage disk 52. Blade shank 235 of blade 233 also does not include an axially-extending tooth, as in the embodiment shown in FIGS. 2 and 4.

In the embodiment shown in FIGS. 7 and 8 the connection between the turbine and the sealing ring to minimize relative rotation therebetween is provided on aft arm 234. A radially-outwardly-extending projection 236 that is carried by and that extends from aft disk engagement member 238 protrudes into the space between a pair of adjacent second stage disk posts 206, and when the turbine is rotating the projection contacts one of the two posts, depending upon the direction of rotation of the turbine, thereby preventing further relative rotation between the turbine and the sealing ring. Four such projections can be provided on sealing ring 230 at 900 intervals to maintain symmetry of the ring structure and thereby prevent an unbalance condition of the ring.

As will be appreciated by those skilled in the art, the provision of an interstage sealing ring as a unitary structure of the type herein illustrated and described facilitates turbine assembly operations. The need to provide and to properly orient separate annular blade retainers to contact the aft side of the first stage disk and to contact the forward side of the second stage disk is eliminated.

The elimination of two annular blade retainers also results in improved rotor blade cooling. Because such annular blade retainers overlie the blade shanks, cooling air apertures must be provided in the retainers to allow the cooling air to enter the blade shank cooling air passageways. Cooling air that flows through such apertures in the blade retainers undergoes a pressure drop, thereby causing the temperature of the cooling air to increase. Utilizing an interstage sealing ring of the type described and illustrated herein, however, provides an additional advantage in that its use avoids the need to use annular blade retainers with cooling air apertures, and it allows direct flow of cooling air into the passageways between the blade dovetails and the slots in the rotor disk, thereby avoiding the cooling air pressure drop associated with annular blade retainers. Consequently, when a unitary interstage sealing ring of the type described and illustrated herein is employed, the cooling air that is supplied to the turbine blades is at a lower temperature, which permits either higher turbine inlet temperatures, for higher thermal efficiency and higher thrust output, or, alternatively, a reduction in the cooling air flow rate.

Although particular embodiments of the present invention have been illustrated and described, it would be apparent to those skilled in the art that various changes and modifications can be made without departing from the spirit of the present invention. It is therefore intended to encompass within the appended claims all such changes and modifications that fall within the scope of the present invention.

What is claimed is:

1. An interstage sealing ring for sealing a space between a pair of adjacent turbine rotors of a multi-stage turbine, said sealing ring comprising:

a substantially disk-shaped body member having first and second axially-spaced, substantially radially-outwardly-extending arms;

a substantially axial forward arm carried by the first radial arm, the forward arm including a forward disk engagement member that includes a forward disk engagement surface for engagement with a first turbine rotor; and a substantially axial aft arm carried by the second radial arm, the aft arm having an aft disk engagement member that includes an aft engagement surface for engagement with a second turbine rotor that is spaced axially from the first turbine rotor, the interstage waling ring defining a bridging member extending between adjacent turbine rotors to confine cooling air that flows into a space between the adjacent turbine rotor disks so the cooling air flows into cooling air passageways within turbine rotor blades carried by the rotors wherein at least one of the forward arm and the aft harm includes at least one projection for engagement with an adjacent turbine rotor to limit relative rotation between the sealing ring and the adjacent turbine rotor.

2. An interstage sealing ring in accordance with claim 1 wherein the radially-outwardly-extending arms terminate in sealing teeth for sealing engagement with a stationary annular sealing ring.

3. An interstage sealing ring in accordance with claim 2, wherein the body member includes a hub and the forward and aft arms are carried by the first and second radial arms between the sealing teeth and the hub.

4. An interstage sealing ring in accordance with claim 1, wherein the at least one projection is carried by the forward arm.

5. An interstage sealing ring in accordance with claim 4, wherein the at least one projection extends in a substantially axial direction.

6. An interstage sealing ring in accordance with claim 1 wherein the first turbine rotor disk includes axially-rearwardly-extending teeth for cooperative engagement with the teeth carried by the axial first arm.

7. An interstage sealing ring in accordance with claim 1, wherein the at least one projection is carried by the aft arm.

8. An interstage sealing ring in accordance with claim 7, wherein the at least one projection extends in a substantially radial direction.

9. An interstage sealing ring in accordance with claim 8, wherein the second turbine rotor includes at least one axially-extending projection for cooperative engagement with the at least one projection carried by the aft arm.

10. An interstage sealing ring in accordance with claim 1, wherein the forward disk engagement member is movable radially and axially relative to the forward arm.

11. An interstage sealing ring in accordance with claim 1, wherein the aft arm includes an angularly-extending portion that is inclined relative to the second radial arm.

12. An interstage sealing ring in accordance with claim 11, wherein the inclination of the angularly-extending portion relative to the second radial arm is about 40°.

13. An interstage sealing ring in accordance with claim 1, wherein the aft arm includes an angularly-extending portion that is inclined relative to the second radial arm, and an axially-extending portion connected with and extending from the angularly-extending portion.

14. An interstage sealing ring in accordance with claim 13, wherein the angularly-extending portion is connected with the second radial arm.

15. An interstage sealing ring in accordance with claim 1, wherein outer ends of the first and second radial arms are independently deflectable relative to each other.

16. An interstage sealing ring in accordance with claim 1, wherein the aft arm includes a first, inclined section that extends from the second radial arm, and a second, axial section that extends between the inclined section and the engagement surface that engages the second turbine rotor disk.

17. A turbine cooling system for a multi-stage turbine that includes a pair of axially-spaced turbine rotors, said cooling system comprising:

an interstage cooling chamber defined between a pair of axially-adjacent first and second turbine rotors, an annular rotor-disk connecting ring positioned adjacent a hub of each turbine rotor and interconnecting the adjacent rotors for co-rotation, and an interstage sealing member positioned radially outwardly of the disk connecting ring;

a plurality of cooling air passageways extending through the first turbine rotor for conveying cooling air through the rotor and into the interstage cooling chamber;

the interstage sealing member including a substantially disk-shaped body member having a pair of first and second axially-spaced, substantially radially-outwardly-extending arms;

a forward arm extending from the first radial arm and terminating in a forward disk engagement member for engagement with a first turbine rotor; and an aft arm extending from the second radial arm and terminating in an aft engagement member for engagement with a second turbine rotor that is spaced axially from the first turbine rotor, wherein the interstage sealing member includes at least one projection for contacting at least one turbine rotor to limit relative rotation between the sealing member and the turbine rotor.

18. A turbine cooling system in accordance with claim 17, wherein at least one turbine rotor carries a plurality of blades that include blade shanks having an axially-extending projection that extends into the cooling chamber, and wherein the at least one projection carried by the interstage sealing-member contacts a blade shank projection for limiting relative rotation between the interstage sealing member and the turbine rotor.

19. A turbine cooling system in accordance with claim 17, wherein the at least one projection carried by the interstage sealing member contacts an axial projection carried by at least one turbine rotor to limit relative rotation between the sealing member and the turbine rotor.

* * * * *